US006944406B1

(12) United States Patent
Way

(10) Patent No.: US 6,944,406 B1
(45) Date of Patent: Sep. 13, 2005

(54) TRANSPORT SYSTEM WITH TUNABLE CHANNEL SPACING DWDM

(75) Inventor: David G. Way, Garland, TX (US)

(73) Assignee: Fujitsu Limited, Kawasaki (JP)

( * ) Notice: Subject to any disclaimer, the term of this patent is extended or adjusted under 35 U.S.C. 154(b) by 321 days.

(21) Appl. No.: 09/633,005

(22) Filed: Aug. 4, 2000

(51) Int. Cl.$^7$ .......................................... H04B 10/00
(52) U.S. Cl. ........................ 398/196; 398/182; 398/82
(58) Field of Search ................... 359/124; 398/79–97, 398/182–201

(56) References Cited

U.S. PATENT DOCUMENTS

| | | | |
|---|---|---|---|
| 5,202,782 A | 4/1993 | Nakamura et al. .......... | 359/152 |
| 5,357,097 A * | 10/1994 | Shiozawa et al. ........... | 250/205 |
| 5,404,240 A | 4/1995 | Nishio et al. ............... | 359/123 |
| 5,448,390 A | 9/1995 | Tsuchiya et al. ............ | 359/132 |
| 5,566,018 A | 10/1996 | Lee et al. .................... | 359/341 |
| 5,583,683 A * | 12/1996 | Scobey ........................ | 398/79 |
| 5,841,558 A | 11/1998 | Tamura et al. .............. | 359/124 |
| 5,938,309 A * | 8/1999 | Taylor ......................... | 359/124 |
| 5,943,149 A | 8/1999 | Cearns et al. ............... | 359/124 |
| 5,949,563 A | 9/1999 | Takada ........................ | 359/124 |
| 6,014,237 A | 1/2000 | Abeles et al. ............... | 359/124 |
| 6,014,366 A * | 1/2000 | Ichiyoshi .................... | 370/210 |
| 6,175,586 B1 * | 1/2001 | Lomp ......................... | 375/130 |
| 6,181,450 B1 * | 1/2001 | Dishman et al. ........... | 359/124 |
| 6,400,477 B1 * | 6/2002 | Wellbrook .................. | 359/110 |
| 6,574,018 B1 * | 6/2003 | Handelman ................. | 370/280 |

FOREIGN PATENT DOCUMENTS

| | | | |
|---|---|---|---|
| EP | 0759 681 A2 | 2/1997 | .......... H04Q 11/00 |
| WO | WO 00/34972 | 6/2000 | |
| WO | WO 02/11341 A2 | 2/2002 | .......... H04J 14/02 |

OTHER PUBLICATIONS

J. Roldán et al., "New Algorithm for Management of the Optical Spectrum in Multiwavelength Optical Networks," *Integrated Optoelectronics*, 1994, Proceedings of IEE/LEOS Summer Topical Meetings, 2 pages.
International Search Report in International Application No. PCT/US 01/41598, dated Jun. 21, 2002, 7 pages.
Pieter W. Hooijmans, "Coherent Optical System Design," *John Wiley & Sons Ltd.*, 1994, 412 pages.
Tayebati et al., "Widely Tunable Fabry—Perot Filter Using Ga(A1)As—A1O$_x$ Deformable Mirrors," *IEEE Photonics Technology Letters*, vol. 10, No. 3, Mar. 1998, 4 pages.
Tayebati et al., "Microelectromechanical tunable filter with stable half symmetric cavity," *Electronics Letters*, vol. 34, No. 20, Oct. 1, 1998, 5 pages.
Ghatak et al., "Introuction to Fiber Optics," *Cambridge University Press* 1998, 577 pages.
Gerard Lachs, "Fiber Optic Communications Systems, Analysis, and Enhancements," *McGraw-Hill*, 1998, 401 pages.
Harold Kolimbiris, "Digital Communications Systems With Satellite and Fiber Optics Applications," *Prentice-Hall, Inc.*, 2000, 481 pages.

* cited by examiner

*Primary Examiner*—Agustin Bello
(74) *Attorney, Agent, or Firm*—Baker Botts L.L.P.

(57) ABSTRACT

An optical transport system that uses tunable filters to vary the central wavelengths and spectrum widths of channels within the system to more efficiently use the bandwidth of the fiber. Higher bit rate channels may be divided into multiple lower bit rate channels, and lower bit rate channels may be combined to form higher bit rate channels.

14 Claims, 5 Drawing Sheets

TRANSPORT SYSTEM WITH TUNABLE CHANNEL SPACING DWDM

BACKGROUND AND SUMMARY OF THE INVENTION

The present invention relates to optical transport systems, and more particularly to dense wavelength division multiplexing (DWDM) optical transport systems.

Background: Optical Transport Systems

Consumer and business demand for data transmission capability has increased beyond all expectations with the introduction of the internet. Now, consumers may tap into an information base that literally spans the globe and contains more data than any other single information source. The internet also allows users access to music, video, and other entertainment. Likewise, businesses are now interconnected to a degree previously unheard of. However, the bandwidth of the various transmission media used to transport information limits consumer and business access. Government and industry regulation of airwaves combined with technological limits in data transmission has fostered innovation in telecommunications seeking to expand transmission capability in an effort to meet the ever growing demand.

Fiber optic transport systems is one of the promising technologies for increasing data transmission speeds and capacity. Fiber optic lines have many advantages over other media, and relatively recent gains make future use of this technology very attractive to both the buyers and sellers of bandwidth.

Fiber optic systems are bit-rate and format independent. Each of the multiple signals on a fiber can therefore be carried at a different rate and in a different format. For example, a DWDM (dense wavelength division multiplexing) network can transport different signals operating at OC-48 (2.5 Gb/s) and at OC-192 (10 Gb/s) simultaneously. This ability provides open ended growth potential for optical networks, allowing higher bit rate optical carriers (40 Gb/s and 160 Gb/s) to be implemented on existing fiber.

DWDM increases the capacity of embedded fiber by assigning incoming signals to specific frequency (or wavelength) bands within the bandwidth of the transmission. These signals are each modulated onto a light signal. The resulting light signals are then combined into one complex light signal onto one fiber. A given fiber will therefore have multiple channels transmitting simultaneously at different wavelengths and different bit rates, and possibly in different formats.

Several different wavelengths of light are used for optical transport systems. Silica-based fibers have particular characteristics, such as attenuation troughs, that make some wavelengths better choices than others. For example, sources emitting at a wavelength of 1550 nm provide the best attenuation characteristics (about 0.2 dB/km). The light emitted is concentrated at this peak wavelength. This signal is then dispersed over a free spectral range of about 32 nm (from 1530 nm to about 1562 nm). This range is broken into a number of channels, each channel occupying a channel spacing or spectrum line width of about 0.5 nm, corresponding to a particular bit rate. Most systems today operate in the C-band, or conventional band.

All current DWDM transport systems are designed with fixed channel spacings, meaning the hardware used does not allow channel spacings to be varied. Emitters are tuned to emit carrier frequencies corresponding to the central wavelength of a particular channel spacing within the system. These carrier signals are modulated to carry information, which could be video, voice, or any other type of information. Modulation increases the bandwidth of the signal in proportion to the amount of information transmitted. Higher bit rate signals require greater bandwidth channels. Filters within the DWDM system filter the modulated signals so that only frequencies within that channel's bandwidth may be coupled to the fiber. This eliminates noise and reflection between channels. Each emitter operates on a single channel, and the filters are of fixed bandwidth, which means that each channel in the DWDM system can only accommodate bit rates that require no more bandwidth than that channel's filter can pass. If more information is attempted to be modulated onto a channel than that channel is designed to carry, the bandwidth after modulation would be too great to pass the filters. Changing the bit rates of the channels currently requires changes in hardware.

As a simplified example, a system might be designed for two OC-48 carriers, one OC-192 carrier, and one OC-768 carrier. The channel spacings and spectrum widths of such a system are shown in FIG. 1. These channel spacings are fixed. For instance, the OC-48 carriers would occupy channels with a frequency bandwidth of 50 GHz centered on wavelengths $\lambda_1$ and $\lambda_2$. The OC-192 carrier would occupy a frequency bandwidth of 100 GHz centered at another wavelength, $\lambda_3$. The OC-768 carrier would occupy a frequency bandwidth of 200 GHz centered at wavelength $\lambda_4$.

FIG. 2 shows a simplified hardware configuration for a fixed channel spacing system 200. The signals are combined by combiners 202 and coupled into the transmission fiber 204. This system could handle two transmissions of 2.5 Gb/s (the two OC-48 lines), one transmission of 10 Gb/s (OC-192), and one transmission of 40 Gb/s (OC-768). These channel spacings are fixed, both in their central wavelength and in spectrum width.

Because the channels are of fixed spacing, the total bandwidth may not be used efficiently in many situations. For example, if the smaller bit rate transmissions are transmitted on higher bit rate channels then the full capacity of the system is not used. If such a system needed to accommodate three 2.5 Gb/s transmissions and one 40 Gb/s transmission, the OC-192 channel would be used for a 2.5 Gb/s transmission. This causes the smaller spectrum transmission to occupy unnecessary bandwidth in the DWDM system. A diagram of the channel spacing distribution in such a circumstance is shown in FIG. 3. The 2.5 Gb/s transmission on $\lambda_3$ does not occupy the full spectrum width allocated to that channel, because that channel is designed to accommodate a 10 Gb/s transmission. This results in unnecessarily unused bandwidth.

Another circumstance where fixed channel spacing wastes bandwidth occurs when there is sufficient unused bandwidth on the fiber to accommodate a high bit rate signal, but that unused bandwidth is already distributed among several fixed, lower bit rate channels. In this case, the high bit rate signal may not be transmitted, and fiber capacity is wasted.

Fiber optic communications would therefore greatly benefit from a system that decreased the fiber waste from low bit rate signals occupying high bit rate channels, and allowed multiple low bit rate channels to accommodate a high bit rate signal.

Transport System with Tunable Channel Spacing DWDM

The present invention improves on all current optical transport systems by allowing the various channel spacings on a fiber to be tunable in either bandwidth, central wavelength, or both.

In the preferred embodiment, tunable filters are used to vary the spectrum width of channel spacings. Since the widths of channel spacings are variable, different amounts of data may be modulated onto a given carrier signal within a given channel, and the bandwidth allocated to that channel can be dynamically changed to accommodate the increase or decrease in bit rate. Tuning the widths of channels in this way allows for the most efficient use of system bandwidth by allocating narrow bandwidth channels to low bit rate signals and wider bandwidth channels to higher bit rate signals.

For example, if the required bit rate for a signal changes due to an increase or decrease in traffic, the channel spectrum widths may be dynamically varied for the most efficient use of the fiber bandwidth. Multiple lower bit rate channel spacings may be combined into a single higher bit rate channel spacing by simply increasing the passband of one of the tunable filters to include the passbands of the combined low bit rate channel spacings. In this case, the now "unused" low bit rate channels that were absorbed are turned off.

Conversely, if the traffic on a high bandwidth channel decreases, that channel's spectrum width can be tuned to a narrower width by, for example, decreasing the passband of the necessary filter. This would free up bandwidth for other signals, allowing the most efficient use of the fiber transmission bandwidth.

The disclosed innovations, in various embodiments, provide one or more of at least the following advantages:

allows mixed variable bit rates on a single fiber;

combining lower bit rate channel spacings to create higher bit rate channel spacings;

divide higher bit rate channel spacings to create lower bit rate channel spacings.

BRIEF DESCRIPTION OF THE DRAWING

The disclosed inventions will be described with reference to the accompanying drawings, which show important sample embodiments of the invention and which are incorporated in the specification hereof by reference, wherein.

DETAILED DESCRIPTION OF THE PREFERRED EMBODIMENTS

The numerous innovative teachings of the present application will be described with particular reference to the presently preferred embodiment (by way of example, and not of limitation).

Figure 1:
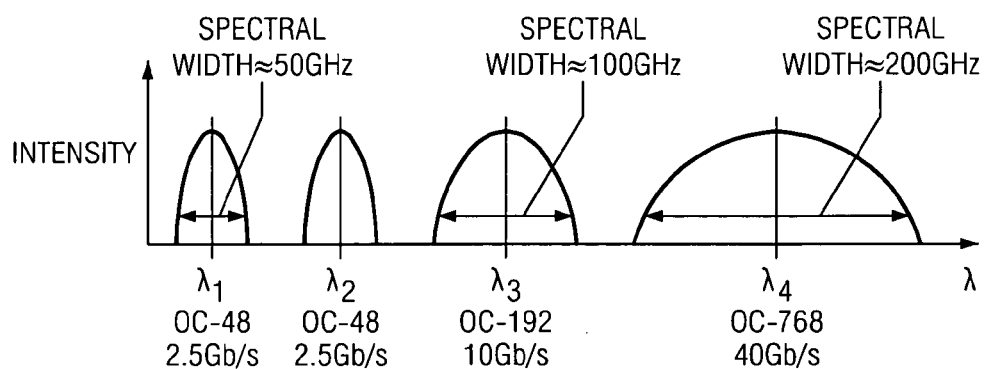
FIG. 1 shows an example of channel spacing and spectrum widths of a typical optical transport system.
Figure 2:
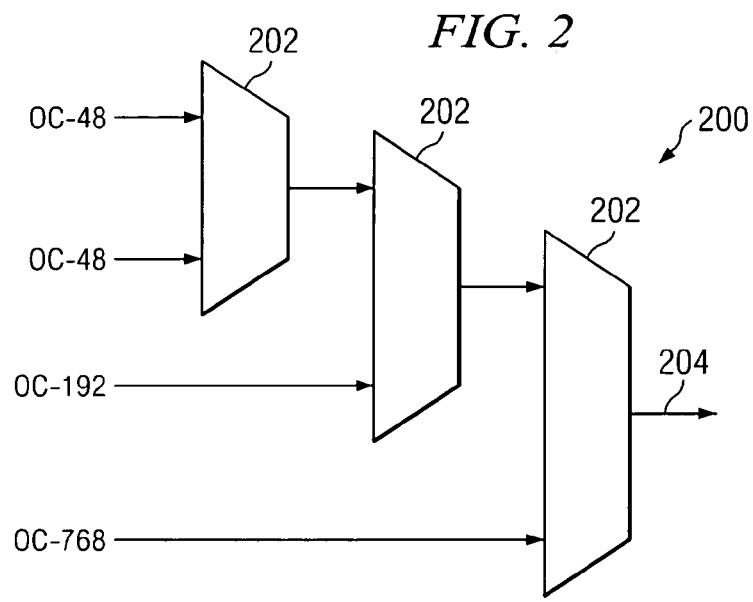
FIG. 2 shows the hardware architecture for a fixed channel spacing optical transport system.
Figure 3:
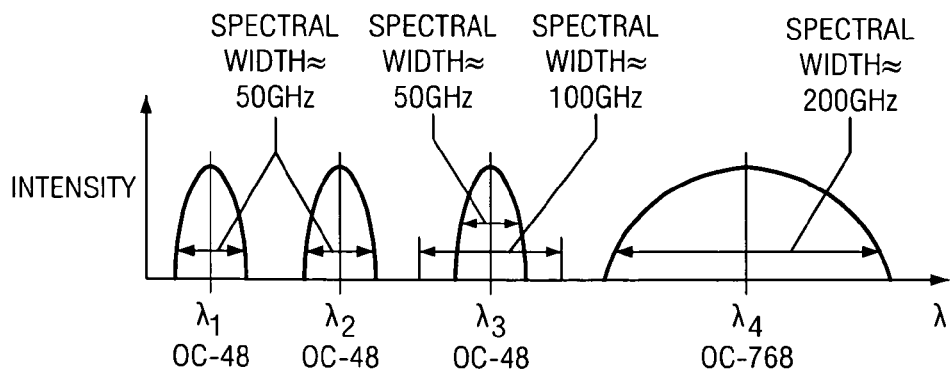
FIG. 3 shows how carrier requirement and channel spacing availability mismatch causes waste of bandwidth.
Figure 4:
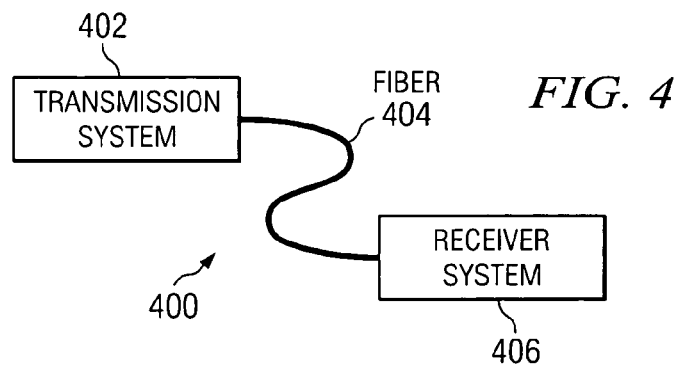
FIG. 4 shows an optical transport system.
Figure 5:
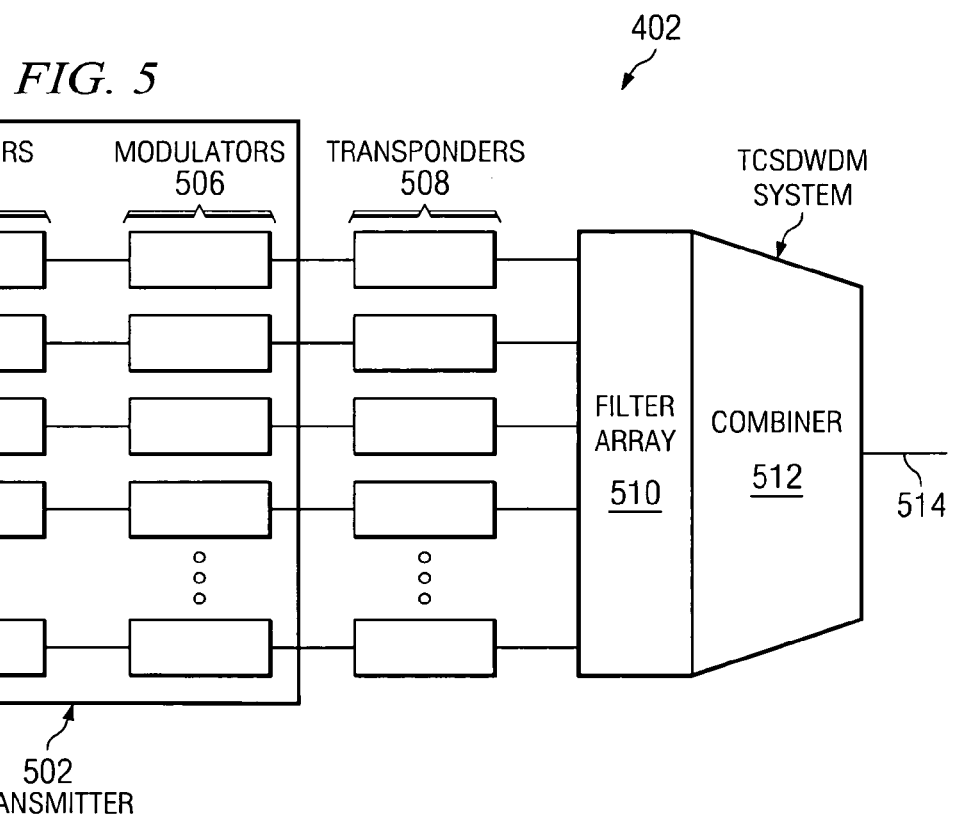
FIG. 5 shows the architecture of the transmission system.

The optical transport system 400 of the preferred embodiment consists of a transmission system 402, a transmission medium 404, and a receiver system 406, as shown in FIG. 4. The transmission system 402, detailed in FIG. 5, includes the transmitter 502 consisting of several emitters 504 each emitting a carrier signal tuned to a channel central wavelength. This signal is intensity modulated, for instance, by a Mach-Zender interferometer. The modulation alters the intensity of the carrier signal by constructive and destructive interference through the interferometer to encode the information signal onto the carrier, so that after modulation the emitted light contains the data to be transmitted. Modulating more data onto a channel increases the bandwidth requirement for that channel. For example, a 2.5 Gb/s data stream typically occupies a 50 GHz channel space, while a 10 Gb/s data stream occupies a 100 GHz channel space.

Each channel emitter is coupled to the TCSDWDM system (via transponders 508), which combines the many physically separate signals onto a single fiber for transmission. The TCSDWDM system includes an array of tunable filters 510, one for each channel of the system, and a combiner 512, which may be a passive optical component that combines multiple signals of varying wavelength onto a single output medium 514.

Figure 6:
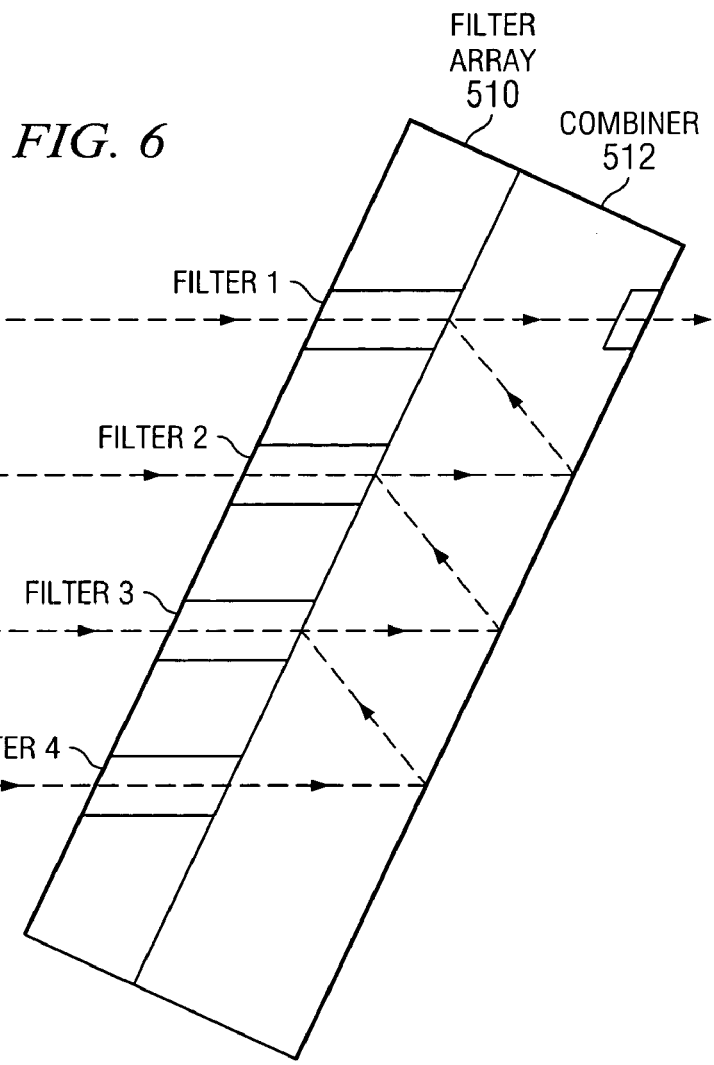
FIG. 6 shows tunable filters and a combiner.

The operation of the combiner 512 and tunable filters 510 is briefly discussed in reference to FIG. 6. Four incoming channels are shown for simplicity, but any number of channels might be included. Each incoming channel of spatially separated light passes a tunable filter 510 tuned to pass only the specific bandwidth of the desired channel's spectrum width. The filtered light reflects multiple times within the combiner 512 until it is output onto the fiber. Each input channel, after a number of reflections, is incident on the output port where it is coupled onto the fiber.

The channel spacings of the innovative optical transport system are tunable by varying the passbands of the tunable filters. In the preferred embodiment, the tunable filters are selected to have a minimum passband such that they may be tuned as narrow as the spectrum width of the lowest bit rate channel on the system. The tunable channel spacing system allows the bandwidth of each channel to be varied so that a low bit rate channel space may be combined with adjacent bandwidth channels to form a higher bit rate channel space. Likewise, higher bit rate channel spaces may be divided into smaller bit rate channel spaces. Tuning the channel bandwidths allows each channel to accommodate lower or higher bit rate signals as necessary for optimal total system bandwidth usage. The functioning of the tunable system and some of its applications are discussed below.

Figure 7:
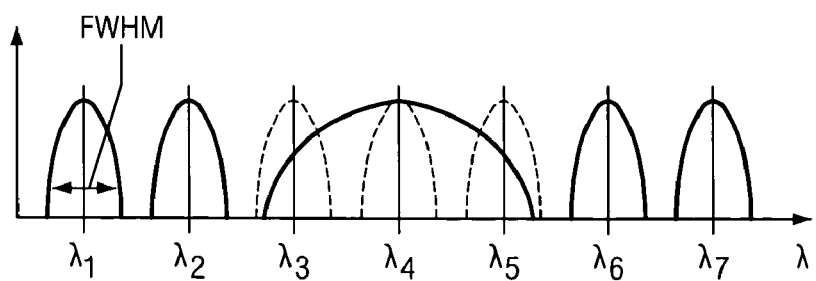
FIG. 7 channel configuration and spectrum distribution in an optical transport system that uses tunable channel spacing.

The use of TCSDWDM to combine lower bit rate channel spaces is discussed in reference to FIG. 7, which shows several channels represented by the central wavelengths of each channel, $\lambda_1$, $\lambda_2$, etc. In this example, channel spaces 3, 4, and 5 (centering on central wavelengths $\lambda_3$, $\lambda_4$, $\lambda_5$) are combined to form a single higher bandwidth channel space.

As groups of channel spaces are combined, a single channel space within the group is tuned to a wider passband, expanding its spectrum width and its bit rate capacity to include the spectra of the adjacent channel spaces in the group. These adjacent channels are no longer used as individual channels per se, and their transponders are turned off. In FIG. 7, channel spaces 3, 4, and 5 have been combined to form a single channel space centering on the central wavelength for channel 4. The tunable filter for channel 4 is tuned to a higher passband, so that the spectrum width of the new channel space encompasses the available bandwidth from all three channel spaces. The transponders for central wavelengths lambda 3 and 5 are turned off.

Figure 8:
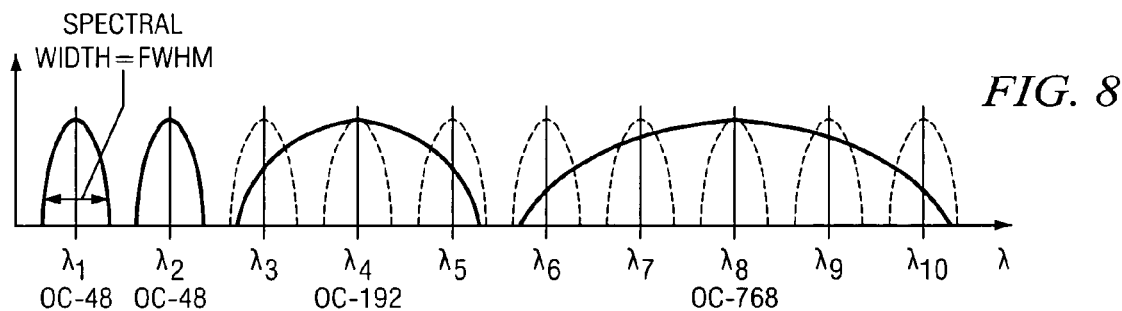
FIG. 8 shows channel spacing configuration and spectrum distribution in an optical transport system that uses tunable channel spacing.

For example, if the channels shown for $\lambda_1$, etc., are OC-48 carriers, their spectrum width in the frequency domain would be large enough to accommodate that bit rate, a typical value being 50 GHz for each channel. By combining three 50 GHz channel spaces, a single channel space of approximately 150 GHz bandwidth, and correspondingly higher bit rate, is created. (In a crowded system, greater bandwidth could also be left between channels to reduce crosstalk.) Larger bit rate channel spaces can be created by combining any number of smaller bit rate channel spaces, as shown in FIG. 8. Here, ten OC-48 channel spaces have been configured using the present innovations to make two OC-48, one OC-192, and one OC-768 channel space.

A higher bit rate channel space can later be broken down into multiple smaller bit rate channel spaces when bandwidth requirements for that channel have lessened. The passband of the tunable filter for the high bit rate channel space is tuned down to a smaller spectrum width, freeing up bandwidth for adjacent channel spaces. The transponders for the newly formed channels are turned on, allowing data streams to once again occupy the new smaller channel spaces. This innovative tunability of channel spacings permits allocation of bandwidth to carriers who experience high traffic on their lines for short periods but do not need higher bit rates at all hours of the day.

Figure 9:
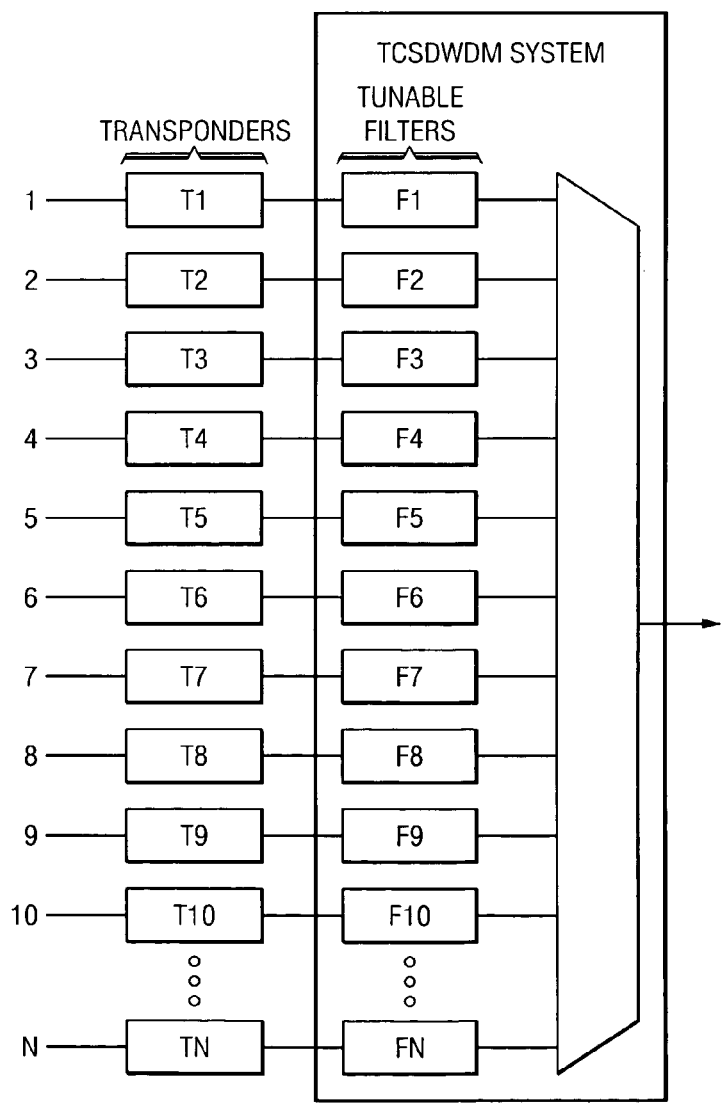
FIG. 9 shows the hardware configuration for a TCSD-WDM system.

FIG. 9 is a block diagram showing the general configuration of a TCSDWDM transport system using tunable filters. In a preferred embodiment, modulated signals from N carriers enter the respective transponders (T1, T2, . . . , TN), which couple the transmissions into the TCSDWDM system. The TCSDWDM system is made up of an array of tunable filters (F1, F2, . . . , FN) and a combiner. The combiner couples the many signals onto a fiber.

In this example, channel 4 experiences higher bandwidth demand, and channels 3 and 5 are unoccupied. To increase capacity of channel 4, all three channel spaces are combined into a single higher bit rate channel space. Transponders T3 and T5 are turned off, and Filter F4 is tuned to a wider bandpass, encompassing the frequencies previously transmitted on channels 3 and 5, as well as the channel 4 frequencies. FIG. 7 shows the new channel spectrum widths of the first seven channels in such a system.

Figure 10:
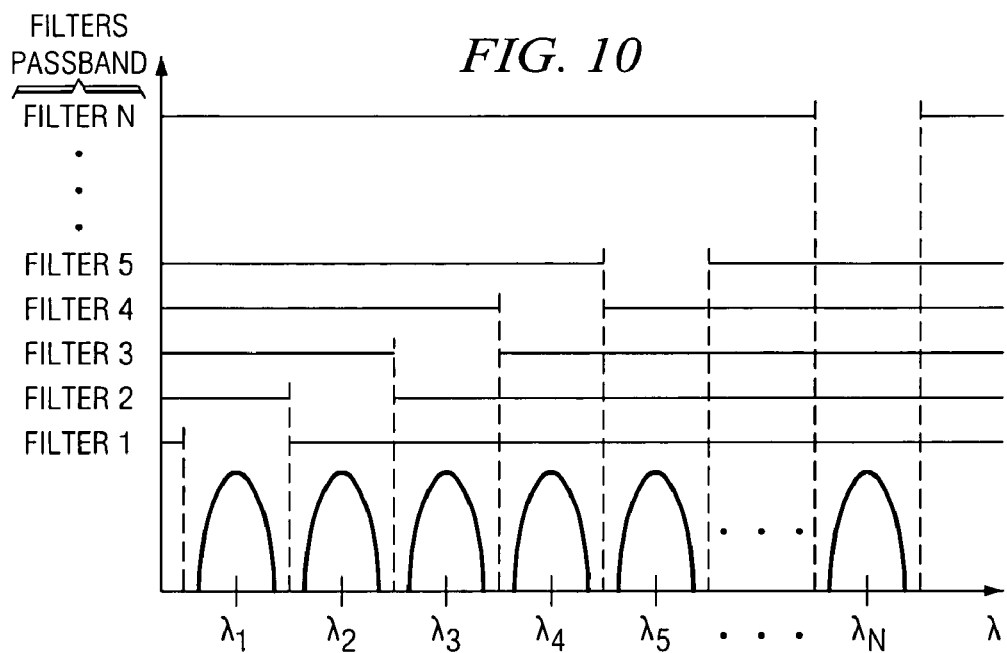
FIG. 10 shows filter tuning and spectrum width relationships.
Figure 11:
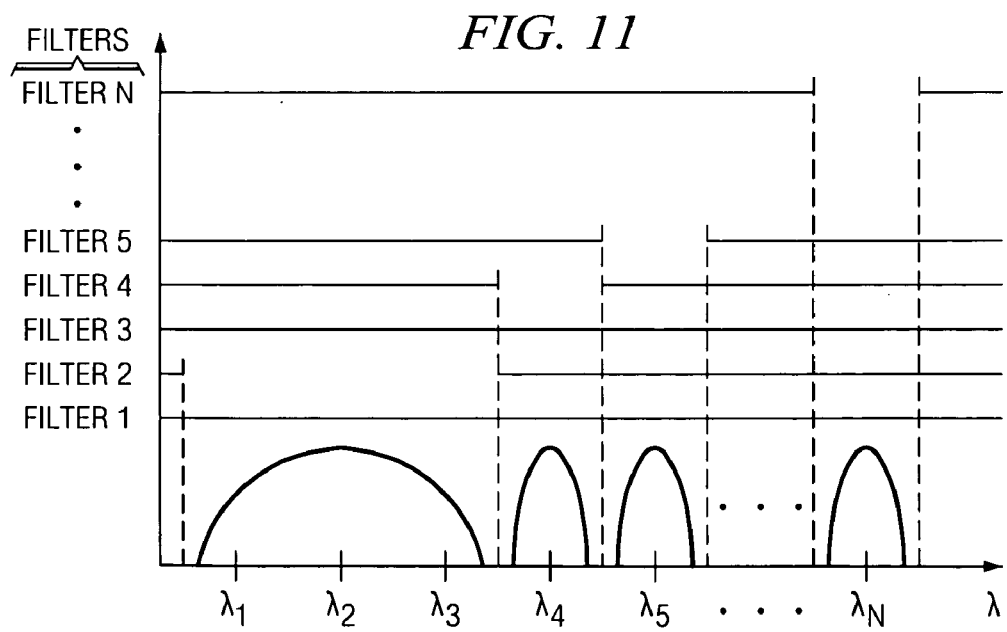
FIG. 11 shows how filter tuning can increase bandwidth for a selected channel.

FIGS. 10 and 11 show the selective use of tunable filters to vary the spectrum widths of channel spaces in a TCSDWDM system. The horizontal axis shows several wavelengths within the transmission bandwidth of the fiber. The filters for each channel are shown on the vertical axis, and the gap in the horizontal line extending across the graph represents the passband for a particular filter. Each filter centers on a central wavelength lambda, and passes light at the frequencies immediately surrounding the central wavelength. (For example, Filter 1 (F1) has a break in its line over $\lambda_1$, the central wavelength for its channel space. The break in the line shows what wavelengths are passed by the filter.) When the filters are tuned to narrow passbands, and all transponders are turned on, each filter creates a low bit rate channel space, passing a different frequency band. These channels are closely spaced, using all available bandwidth in the fiber. In FIG. 10, all filters are tuned to the small spectrum widths, and the central wavelengths, $\lambda_1, \lambda_2, \ldots, \lambda_3$, are closely spaced forming narrow, low bit rate channels.

In FIG. 11, the channel spacing has been altered, shown by the change in passbands for Filters 1, 2, and 3. Channel spaces 1, 2, and 3 (centered on $\lambda_1, \lambda_2, \lambda_3$) have been combined to form a single higher bit rate, wider spectrum width channel space, using $\lambda_2$ as its central wavelength. The passband of Filter 2 now includes wavelengths from what was previously channels 1, 2, and 3. Filters 1 and 3 are shown not to pass any wavelengths, which would actually be accomplished by turning off the transponders to those filters.

Typical optical systems operate using a central wavelength of 1550 nm, using about a 32 nm wide band total. The useable wavelengths for transmission on the fiber are therefore from 1530 nm to 1562 nm. This translates in the frequency domain to about 4000 GHz of bandwidth. If the channel spacings are 50 GHz, or about 0.4 nm of linewidth, this allows 80 channels to exist on the fiber. Increasing the bandwidth decreases the number of channels, so if channel widths are increased to 200 GHz to accommodate higher bit rate signals, only 20 channels fit within the available spectrum.

The system must include one filter for each possible channel, given the minimum possible channel spacings. The minimum channel spacing depends on the minimum passband of the tunable filter. Several tunable filters exist, including high quality micromachined tunable filters based on distributed Bragg reflectors (DBR) and micromechanically tunable Fabry-Perot etalon devices using quarter wave stack mirrors. These types of mirrors are generally capable of producing linewidths of 0.3 nm or less, with free spectrum ranges (tuning ranges) of more than 70 nm, and insertion losses of less than 1 dB.

The primary advantages of the innovative optical transport system are the ability to include mixed bit rates on the fiber, the ability to vary the bit rates of the channels, the ability to provide a higher bit rate signal tuned to a carrier's particular need by combining lower bit rate channel spaces into a higher bit rate channel space, the ability to divide a higher bit rate channel space into several low bit rate channel spaces, and the overall ability to dynamically distribute carriers within the available bandwidth for the most efficient use of the fiber's capacity.

Definitions:

Following are short definitions of the usual meanings of some of the technical terms which are used in the present application. (However, those of ordinary skill will recognize whether the context requires a different meaning.) Additional definitions can be found in the standard technical dictionaries and journals.

DWDM: a fiber optic transmission technique that employs light wavelengths to simultaneously transmit data by combining multiple signals transmitted on different frequency or wavelength bands.

Multiplexing: combining multiple light signals into a single light signal for propagation through a medium.

Optical Amplifiers: devices that directly amplify light signals. Modern amplifiers consist of erbium doped fiber amplifiers.

The following background publications provide additional detail regarding possible implementations of the disclosed embodiments, and of modifications and variations thereof, and the predictable results of such modifications: An Introduction to Fiber Optics by Ghatak and Thyagarajan, Cambridge University Press, 1998; Coherent Optical System Design by Hooijmans, John Wiley and Sons, 1994;

Digital Communications Systems: With Satellites and Fiber Optics Applications, Kolimbiris, Prentice Hall, 1999; Fiber Optic Communications: Systems, Analysis, and Enhancements, by Lachs, McGraw Hill Companies, 2000; Widely Tunable Fabry-Perot Filter Using Ga(Al)As-AlOx Deformable Mirrors, Tayebati, et al., IEEE Photonics Technology Letters Vol. 10, No.3, March 1998; Microelectromechanical Tunable Filter with Stable half Symmetric Cavity, Tayebati, et al., Electronics Letters, October 1998, Vol.34, No.20.

Modifications and Variations

As will be recognized by those skilled in the art, the innovative concepts described in the present application can be modified and varied over a tremendous range of applications, and accordingly the scope of patented subject matter is not limited by any of the specific exemplary teachings given.

Additional general background, which helps to show the knowledge of those skilled in the art regarding variations and implementations, may be found in the following publications, all of which are hereby incorporated by reference:

In one class of variations, the system uses both tunable and non-tunable filters together to achieve tunability to passbands narrower than present day tunable filters can achieve.

In another class of variations, the central wavelengths of each channel are tunable as well as the channel widths. This can be accomplished using tunable sources for carrier frequencies.

None of the description in the present application should be read as implying that any particular element, step, or function is an essential element which must be included in the claim scope: THE SCOPE OF PATENTED SUBJECT MATTER IS DEFINED ONLY BY THE ALLOWED CLAIMS. Moreover, none of these claims are intended to invoke paragraph six of 35 USC section 112 unless the exact words "means for" are followed by a participle.

What is claimed is:

1. A method of operating an optical communication system, comprising:
   increasing a spectrum width of a first optical channel space defined by a passband of a first filter by at least an amount equal to a spectrum width of a second optical channel space defined by a passband of a second filter to create a new optical channel space defined by an increased passband of the first filter;
   wherein the new optical channel space has a spectrum width at least equal to a sum of the spectrum width of the first optical channel space and the spectrum width of the second optical channel space; and
   communicating a signal over the new optical channel space at a bit rate requiring the spectrum width of the new optical channel space.

2. The method of claim 1, further comprising deactivating a transponder associated with the second optical channel space.

3. The method of claim 1, wherein the first optical channel space is adjacent the second optical channel space, and wherein the new optical channel space comprises the first optical channel space and the second optical channel space.

4. A fiber optic communication system, comprising:
   a first optical channel space defined by a passband of a first tunable filter and having a first spectrum width;
   a second optical channel space adjacent to the first optical channel space, the second optical channel space defined by a passband of a second tunable filter and having a second spectrum width;
   the second tunable filter operable to increase the second spectrum width of the second optical channel space by at least an amount equal to the first spectrum width to create a new optical channel space defined by an increased passband of the second tunable filter and having a third spectrum width, the new optical channel space operable to carry a signal at a bit rate requiring the third spectrum width.

5. The system of claim 4, further comprising a transponder associated with the first optical channel space, the transponder configured to be deactivated when the new optical channel space is created.

6. The system of claim 4, wherein the first optical channel space is adjacent the second optical channel space, and wherein the new optical channel space comprises the first optical channel space and the second optical channel space.

7. A method of operating an optical communication system, comprising:
   dividing a first spectrum width of a first optical channel space defined by a passband of a first filter to create a second optical channel space defined by a decreased passband of the first filter and having a second spectrum width and a third optical channel space defined by a passband of a second filter having a third spectrum width;
   wherein a sum of the second spectrum width and the third spectrum width is equal to or less than the first spectrum width;
   communicating a signal over the second optical channel space at a bit rate requiring a spectrum width equal to or less than the second spectrum width; and
   communicating a signal over the third optical channel space at a bit rate requiring a spectrum width equal to or less than the third spectrum width.

8. The method of claim 7, wherein the second optical channel space is adjacent the third optical channel space, and wherein the second optical channel space and the third optical channel space collectively comprise the first optical channel space.

9. The method of claim 7, further comprising activating a transponder associated with the second optical channel space and a transponder associated with the third optical channel space when the new channel space is created.

10. A fiber optic communication system, comprising:
    a first optical channel space defined by a passband of a first tunable filter and having a first spectrum width;
    the first tunable filter operable to divide the first spectrum width of the first optical channel space to create a second optical channel space defined by a decreased passband of the first tunable filter and having a second spectrum width and a third optical channel space adjacent to the second optical channel space, the third optical channel space defined by a passband of a second tunable filter and having a third spectrum width; and
    wherein a sum of the second spectrum width and the third spectrum width is equal to or less than the first spectrum width.

11. The system of claim 10, wherein the second optical channel space and the third optical channel space collectively comprise the first optical channel space.

12. The system of claim 10, further comprising a transponder associated with the second optical channel space and a transponder associated with the third optical channel space, the transponders configured to be activated when the new optical channel space is created.

13. A method of operating an optical communication system, comprising:
- communicating through a first transponder a first signal over a first optical channel space at a bit rate requiring a first spectrum width of the first optical channel space;
- communicating through a second transponder a second signal over a second optical channel space at a bit rate requiring a second spectrum width of the second optical channel space;
- increasing the first spectrum width of the first optical channel space by at least an amount equal to the second spectrum width of the second optical channel space to create a new optical channel space;
- wherein the new optical channel space has a spectrum width at least equal to a sum of the first spectrum width of the first optical channel space and the second spectrum width of the second optical channel space;
- deactivating the second transponder after increasing the first spectrum width of the first optical channel space; and
- communicating through the first transponder a signal over the new optical channel space at a bit rate requiring the spectrum width of the new optical channel space.

14. A method of operating an optical communication system, comprising:
- communicating through a first transponder a first signal over a first optical channel space at a bit rate requiring a first spectrum width of the first optical channel space;
- dividing the first spectrum width of the first optical channel space to create a second optical channel space having a second spectrum width and a third optical channel space having a third spectrum width;
- wherein a sum of the second spectrum width and the third spectrum width is equal to or less than the first spectrum width;
- communicating through the first transponder a signal over the second optical channel space at a bit rate requiring a spectrum width equal to or less than the second spectrum width; and
- activating a second transponder to communicate a signal over the third optical channel space at a bit rate requiring a spectrum width equal to or less than the third spectrum width.

* * * * *

UNITED STATES PATENT AND TRADEMARK OFFICE
CERTIFICATE OF CORRECTION

PATENT NO. : 6,944,406 B1 Page 1 of 1
APPLICATION NO. : 09/633005
DATED : September 13, 2005
INVENTOR(S) : David G. Way It is certified that error appears in the above-identified patent and that said Letters Patent is hereby corrected as shown below:

Column 5, Line 47, delete "bandpass" and insert -- passband --.

Signed and Sealed this

Nineteenth Day of December, 2006

JON W. DUDAS
*Director of the United States Patent and Trademark Office*